May 30, 1967  E. J. COPPAGE, JR  3,322,028
PHOTOGRAPHIC ENLARGER

Filed Sept. 22, 1964  7 Sheets-Sheet 1

INVENTOR.
EDWIN J. COPPAGE, JR.

BY Newton, Hopkins & Jones

ATTORNEYS

INVENTOR.
EDWIN J. COPPAGE JR.
BY
Newton, Hopkins & Jones
ATTORNEYS

Fig. 10

INVENTOR.
EDWIN J. COPPAGE JR.
BY
Newton, Hopkins & Jones
ATTORNEYS

United States Patent Office 3,322,028
Patented May 30, 1967

3,322,028
PHOTOGRAPHIC ENLARGER
Edwin J. Coppage, Jr., 630 Cleburne Terrace NE.,
Atlanta, Ga. 30307
Filed Sept. 22, 1964, Ser. No. 398,226
21 Claims. (Cl. 88—24)

This invention relates generally to photographic enlarging apparatus and more particularly to apparatus for reorienting points in an enlarged image with respect to their orientation in the copied negative, providing uniform illumination of all points in the enlarged image plane when disregarding variation in the negative density, and providing automatic focus of the enlarger for all rates of enlargement.

Reorientation of points in the image plane with respect to their orientation in the copied negative is variously referred to as perspective control, distortion control, restitutional projection, etc., and is most commonly used to restore parallelism to lines that converge in the negative due to intentional or unintentional vertical tilt of the camera when the negative was made. Such perspective control has also been used for producing rectangular coordinate maps from perspective aerial photographs.

A striking example of this convergence is found in a picture of a tall building that has been taken from a point close to the building so the camera had to be tilted, pointing the lens up to include the entire buiding. Due to natural perspective, the vertical lines of the building converge in the photograph, causing a very distorted appearance of the building.

With any enlarging apparatus capable of various rates of enlargement, it is necessary to provide some means to focus the apparatus, that is, to position the negative and the printing paper in conjugate focal planes.

Various types of apparatus have been devised for perspective control, a commonly used type is an enlarger wherein the negative is positioned at an angle to the axis of the enlarger lens, and the easel which carries the printing paper is positioned at an angle to the axis of the enlarger lens. The annular positioning of the negative and the printing paper restores parallelism to the lines in the enlarged image, but also creates different optical path lengths between the lens, which is the apparent light source, and the various points on each side of the center line of the enlarged image, and varies the angle of incidence of the light at all points above and below the center line. Therefore, the illumination at different points varies all across the printing paper. This varying illumination exists since the illumination of a point in a surface varies inversely as the square of its distance from the source, and directly as the cosine of the angle which the incident ray makes with a line perpendicular to the surface.

Since it is necessary for the sensitized paper to be uniformly illuminated over its entire area for a correct print, some compensation for the above described non-uniformity must be provided. Customarily, such compensation has been attempted by a procedure called "dodging" wherein the photographer who is making an enlargement using a tilted easel must determine the proper exposure time for the various areas of the projected image and manually pass an opaque material across portions of the projected light at a varying speed to achieve the proper exposure of the various areas of the printing paper. The determination of the different exposure times and the procedure for achieving them are difficult and time consuming.

It would be very desirable and highly advantageous to provide apparatus which would automatically achieve the desired compensation for non-uniform illumination.

In general, the apparatus of the present invention achieves, in enlarging apparatus, reorientation of points in the enlarged image with respect to the copied negative and automatic compensation for non-uniform illumination of the printing paper carried on an easel that is tilted with respect to the axis of the enlarging lens by compensating for the varying optical path lengths and the varying angle of incidence from the effective light source to each point in the enlarged image. This is accomplished by providing a movable light source, the position of which, with regard to a diffusing surface, is determined by the tilt of the printing paper supporting easel through a mechanical linkage. There is also provided apparatus which automatically achieves correct focus in the enlarger for all rates of enlargement. This is accomplished by providing a linkage from the printing paper supporting easel to the negative carrier and the light source to properly position the negative relative to the printing paper, that is, to place the negative and printing paper in conjugate focal planes when the easel is tilted relative to the lens axis for different rates of enlargement. The linkages utilize linear cam surfaces and will accommodate any lens of a designated type with only a simple initial adjustment required. The two linkages interact in a manner such that an automatic focus is realized for all rates of enlargement, and uniform illumination is realized for all tilt positions of the easel and for all rates of enlargement.

It will thus be seen that the present invention provides apparatus wherein the reorientation of points from a negative to printing paper can be achieved. The apparatus provides for correction of illumination across the printing paper at all degrees of reorientation of the points and for all rates of enlargement; and, the apparatus provides for proper focusing at all degrees of reorientation of the points and at all rates of enlargement.

These and other features and advantages of the present invention will become apparent from consideration of the following specifications when taken in conjunction with the accompanying drawings, in which.

Referring now more particularly to the drawings, and to those embodiments of the invention here chosen by way of illustration, the embodiment shown in FIGS. 1–6 includes a generally rectangular housing 10 which has a top 11 and a front wall 12. The top 11 has an access door 14 to allow insertion and removal of the negatives, the door 17 being located directly over the negative carrier of the enlarger. The front wall 12 has an aperture 15 which receives a lens 16.

At one side of the front wall 12, there is a forward projection 18; and, extending from the forward projection 18 there is an easel carrying arm 19 which pivotally carries, at its outermost end, a bracket 20. The bracket 20 is an angle shaped member that is pivotally attached at 21 to the arm 19, and which has a stud 22 that projects through the arm 19, being received by an arcuate slot 24. The slot 24 allows the bracket 20 to rotate to some extent, but limits the rotation. The stud 22 can be provided with a wing nut or similar locking means to fix position of the bracket 20.

An easel 25 is mounted on the bracket 20 and is disposed in a plane perpendicular to the arm 19. Since the easel 25 is mounted on the bracket 20, it will be seen that the easel 25 will rotate with the bracket 20; and as will be seen in FIG. 1 of the drawings, the easel 25 is aligned with the lens 16 so light emanating from the housing 10 will be directed on the easel 25.

The mechanism of the device will be better understood by referring to FIG. 2 of the drawings; and, though the various linkages interact to give the desired final result, the various linkages will be described separately for clarity.

Figure 4:
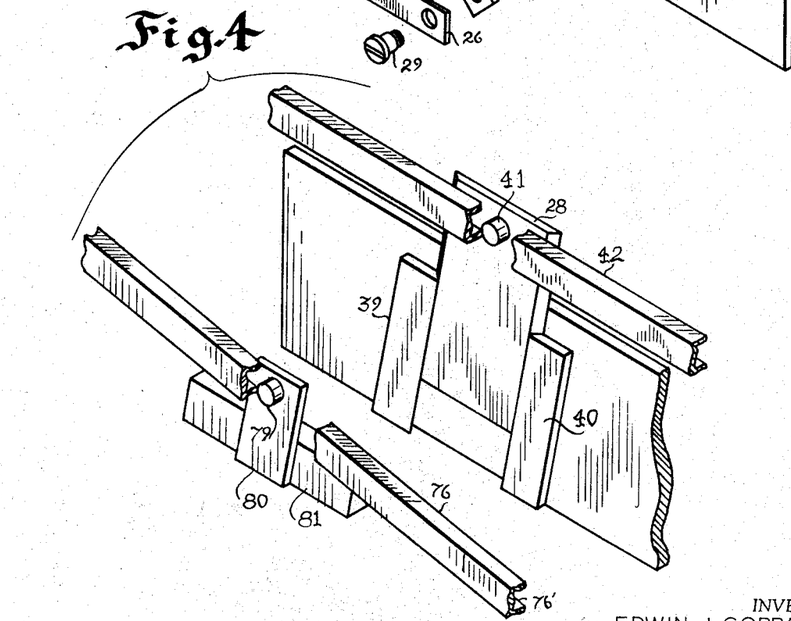
FIG. 4 is an exploded perspective view showing the back side of a portion of the control linkage.
Figure 5:
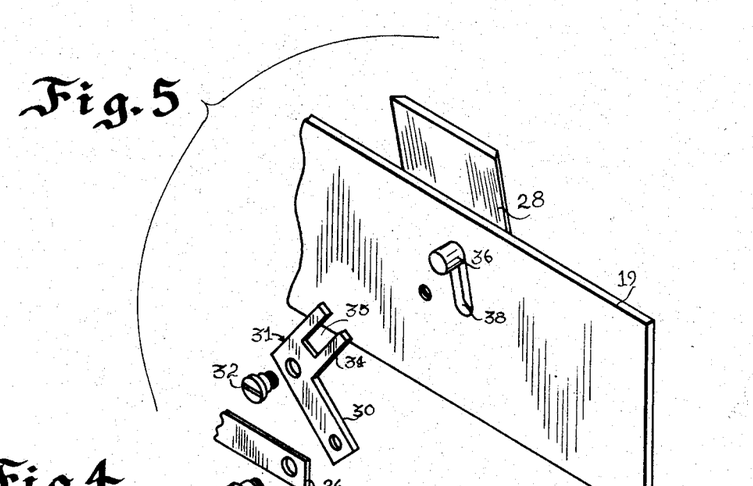
FIG. 5 is an exploded perspective view showing the opposite side of the linkage shown in FIG. 4.

The first linkage to be described is the light positioning linkage which positions the light source relative to a diffusscreen to give uniform illumination on the easel when the easel is at the desired tilt. This linkage includes a horizontally extending bar 26 that is pivotally attached to the easel 25 at the stud 22, and extends rearwardly through the arm 19, extending substantially the full length of the arm 19 to a vertically movable plate 28 that is mounted on the arm 19. The plate 28 and its linkage are best shown in FIGS. 4 and 5 where it will be seen that the bar 26 is pivotally connected, by a shouldered screw 29, to one arm 30 of a bell crank 31. The bell crank 31 is, in turn, pivotally mounted, by a shouldered screw 32, to the arm 19; so, as the bar 26 is reciprocated, the bell crank 31 will be oscillated. The opposite arm 34 of the bell crank 31 has an open ended slot 35 therein which receives a pin 36 that projects rearwardly from the plate 28. The plate 28 is on the opposite side of the arm 19 from the bell crank 31; therefore, an elongated slot 38 is provided in the arm 19, and the pin 36 projects through the slot 38 and into the slot 35 of the bell crank 31. With this arrangement, the plate 28 will be reciprocated substantially vertically when the bar 26 is reciprocated horizontally.

FIG. 5 shows the opposite side of the arm 19 from that shown in FIG. 4, and it will be seen that the plate 28 is mounted for substantially vertical reciprocation between a pair of guide members 39 and 40. The inner edges of the guides 39 and 40 are beveled to overlay the complementarily beveled edges of the plate 28, so the plate 28 is allowed movement in two directions only.

There is a pin 41 at the upper edge of the plate 28, the pin 41 projecting inwardly of the device from the plate 28. This pin 41 is received within the longitudinally extending channel of an arm 42. The arm 42 is one arm of a bell crank that is pivotally attached at 44 (FIG. 2), the other arm 45 of which extends substantially vertically downwardly within the housing 10 forming an acute angle with the arm 42. The arrangement of the pin 41 received within the channel of the arm 42 is required because, as will be seen later, the arm 19 must move longitudinally of the device, carrying with it the plate 28; and, regardless of the longitudinal position of the arm 19, hence the plate 28, the pin 41 must move the arm 42 vertically to rotate the bell crank about the pin 44.

The downwardly extending arm 45 of the bell crank has an elongate slot 46 in its lowermost end to receive the pin 48 that is carried by the rearmost end of the longitudinally extending bar 49. The bar 49 is slidably mounted within brackets 50 that are mounted on the bottom of the housing 10.

A pin 51 that is carried by the bar 49 is received by a bracket 52 on the negative carrier 54. The negative carrier 54 is pivotally mounted to an upstanding bracket 55 by a pivot point 56; therefore, as the bar 49 reciprocates horizontally, the pin 51 received within the bracket 52 will cause the negative carrier 54 to pivot about its pivot point 56.

Figure 1:
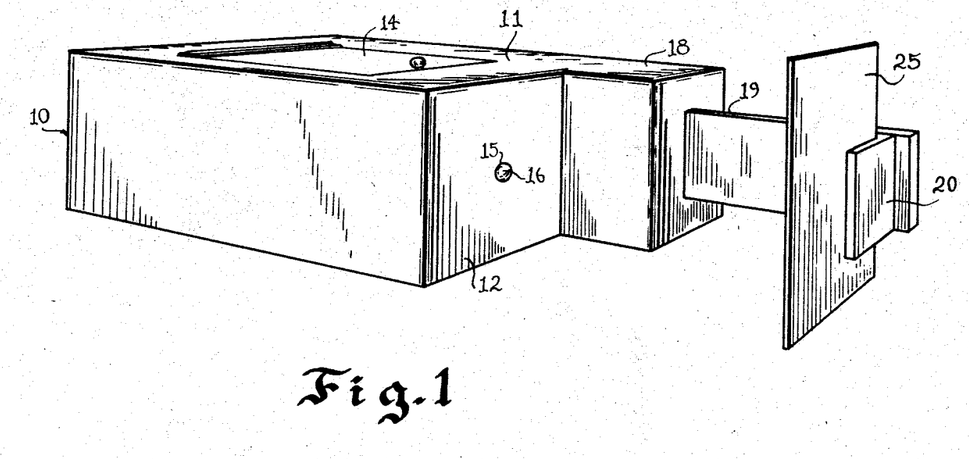
FIG. 1 is a perspective view of one preferred embodiment of the present invention.
Figure 2:
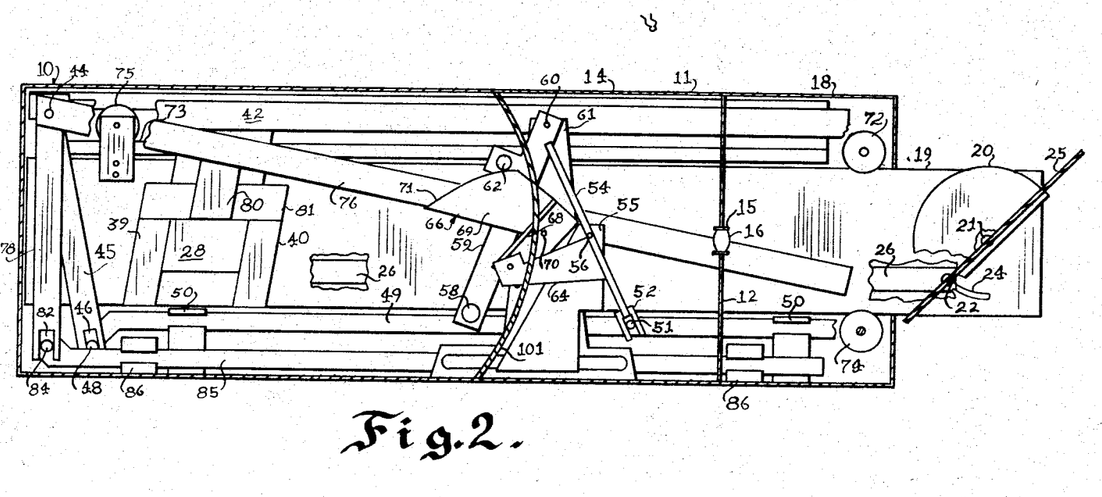
FIG. 2 is a longitudinal cross-sectional view of the device shown in FIG. 1.
Figure 6:
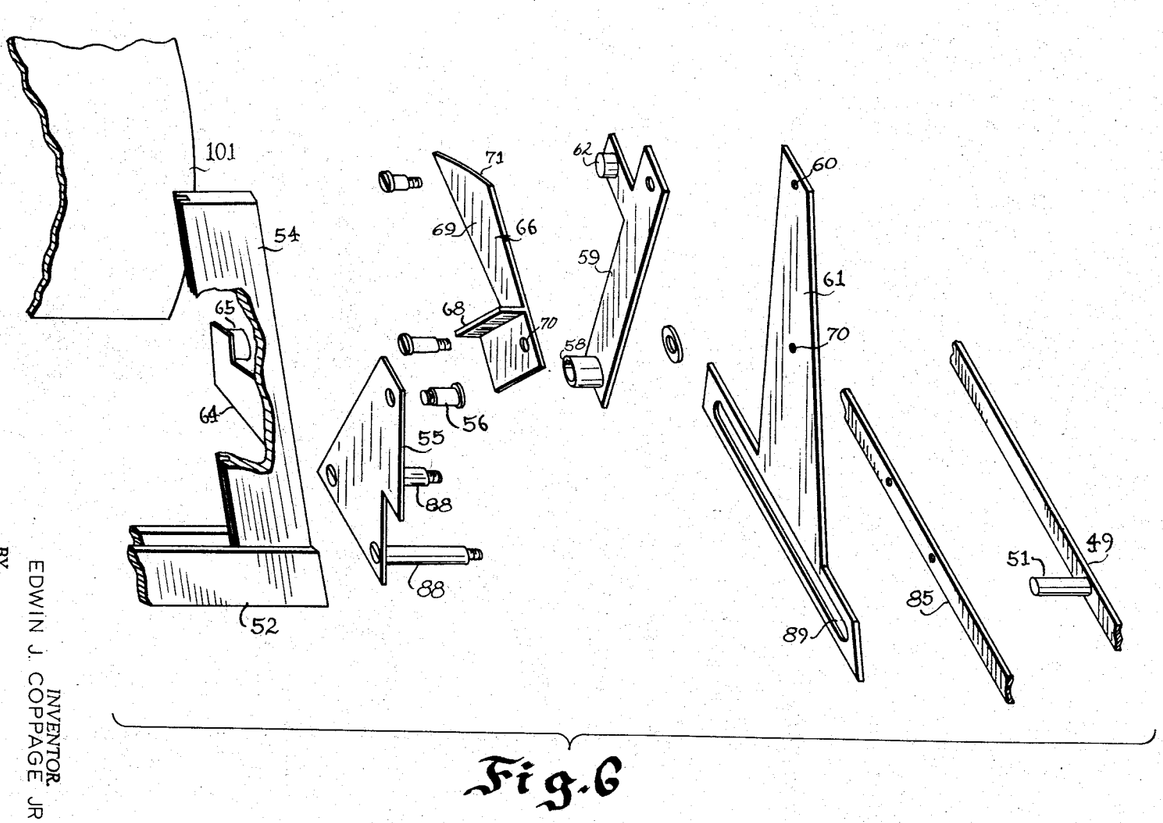
FIG. 6 is an exploded perspective view showing the mounting and cam control of the light source shown in FIG. 2.

The arrangement of the negative carrier 54 and its associated elements can be best seen in FIGS. 2 and 6. The light source 58 is carried by a bar 59 that is pivotally attached at 60 to a bracket 61, the bracket 61 being mounted on the floor, or bottom, of the housing 10. A projection extending substantially perpendicularly from the arm 59 carries a cam follower 62 which positions the light source 58. There is a cam follower carrying arm 64 that is attached to the negative carrier 54 and extends rearwardly thereof, the outer end of the arm 64 carrying a cam follower 65. A member 66 is pivotally attached to the bracket 61 at the elevation of the lens axis and includes a linear cam 68 that is engaged by the cam follower 65 on the arm 64; and, extending upwardly from the linear cam 68, there is a cam 69 having a curved cam surface 71 that is engaged by the cam follower 62.

It will thus be seen that, as the bar 49 is moved rearwardly from that position shown in FIG. 2 of the drawings, the negative carrier 54 will rotate in a clockwise direction, moving the arm 64 and its cam follower 65 upwardly. The upward movement of the cam follower 65 will cause the member 66 to rotate about its pivot point 70, this in turn causing the cam surface 71 to move the cam follower 62 upwardly so that the arm 59 will pivot about its pivot point 60 to move the light source 58. Therefore, as the easel 25 is pivoted about the pivot point 21, the negative carrier 54 will be pivoted about its pivot point 56 and will cause re-location of the light source 58 to give the proper light distribution over the easel 25. The light source 58 is a tubular bulb with a straight line filament, so the light distribution transversely of the device will be uniform.

The next linkage to be described is the focusing linkage which focuses the light on the easel 25 regardless of longitudinal placement of the easel 25. The focusing mechanism is best shown in FIGS. 2, 4 and 6 of the drawings.

To give the desired enlargement of photographs, the arm 19 is extendable from the housing 10. To accomplish the extendability, the arm 19 is mounted to ride on rollers 72 and 74 at the front end of the device; and guide roller 75 is mounted at the rear end of the arm 19 to ride in the track 73. Since the lens 16 is mounted on the wall 12 that is stationary, and the light source 58 remains substantially in the same area of the housing 10, forward movement of the easel 25 will effect an enlargement of the image cast on the easel 25. It will be obvious to those skilled in the art that, as the easel 25 is moved away from the lens 16, the device must be focused, and focusing is usually accomplished by movement of either the lens or the negative; and, since the lens 16 is stationary with respect to the housing 10, the negative will be moved in the device of the present invention.

The linkage to move the negative carrier 54 for focusing includes a second bell crank that is pivotally attached to the pivot point 44 and includes arms 76 and 78. The arm 76 extends forwardly within the housing 10 and, as is shown in FIG. 2, extends downwardly, diagonally across the device. The arm 76 is a channel member, the channel 76' of which receives a pin 79.

The arrangement is best shown in FIG. 4 of the drawings where it will be seen that the pin 79 is carried by a plate 80 which is mounted on a cross-bar 81, the crossbar 81 being mounted on the members 39 and 40. It will be remembered that the members 39 and 40 are fixed to the arm 19 for movement therewith; therefore, the cross member 81 and its plate 80 are also carried by the arm 19 for movement therewith. Referring again to FIG. 2 of the drawings it will be seen that, as the arm 19 is moved forwardly of the device, the plate 80 will be moved forwardly and will carry with it the pin 79 which is riding in the channel 76' of the arm 76. Since the plate 80 is fixed relative to the arm 19, the arm 76 must move upwardly as the pin 79 moves forwardly, thus rotating the bell crank in a counterclockwise direction to move the arm 78 of the bell crank forwardly of the housing 10.

The arm 78 of the bell crank has an elongate slot 82 in its lowermost end, the slot 82 receiving a pin 84 that is carried by a longitudinally extending bar 85. The bar 85 is mounted in brackets 86 in a manner similar to the bar 49 mounted in the brackets 50.

Referring primarily to FIG. 6 of the drawings, it will be seen that the upstanding bracket 55, to which is mounted the negative carrier 54, is attached to the bar 85 by studs 88 so the bracket 55 moves with the bar 85. The studs 88 provide one means to allow the bracket 61 to be secured to the bottom of the housing 10, while the bracket 55 is inwardly of the bracket 61, the studs 88 projecting through the elongate slot 89 in the base of the bracket 61.

Now, keeping in mind the above description of the negative carrier 54 and its associated elements, it will be seen that, when the arm 19 is moved forwardly, the pin 79 will be moved forwardly causing the arm 76 of the bell crank to rise and rotate the bell crank in a counterclockwise direction about the pivot 44. This causes the arm 78 to move forwardly and to move the bar 85 forwardly. Movement of the bar 85 will carry with it the bracket 55 which will move the pivot point 56 of the negative carrier 54 forwardly. Since the bar 49 is, in the present discussion, stationary, the pin 51 will be stationary and will hold the bottom edge of the negative carrier 54 in the same position; thus, the negative carrier 54 will rotate about the pivot point 56 and will move the arm 64 and the cam follower 65. However, the member 66 is pivotally attached to the bracket 61 and will not be moved with the bracket 55; thus, as the arm 64 is raised and shifted toward the lens 16, the roller 65 will move in substantially a straight line toward the pivot 70; hence, the roller 65 will simply roll along the linear cam 68 without changing the position of the cam 68. It will thus be seen that the negative carrier 54 will be moved relative to the lens 16 without changing the position of the light source 58 with respect to the easel 25.

It should be realized that, when the easel 25 is tilted to any angle smaller than the angle shown in FIG. 2, and the easel carrying arm 19 is extended, the pin 51 will move forward; but, movement of the pin 51 will be at a slower rate than movement of the pivot 56, so the above described results will still be had.

Figure 3:
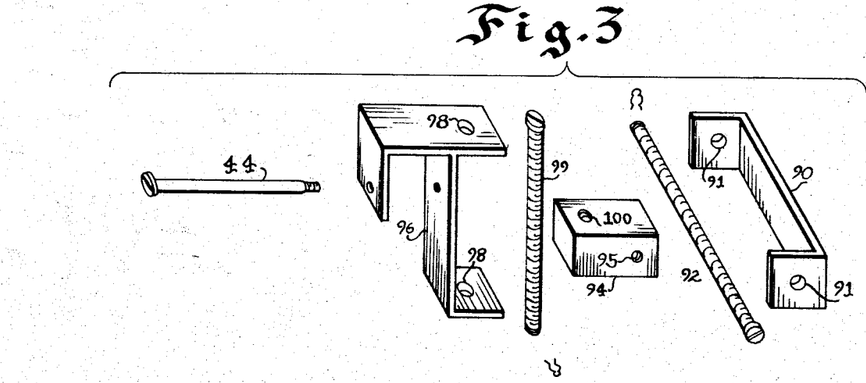
FIG. 3 is an enlarged, exploded perspective showing the means for adjusting the position of the pivot points.

In manufacturing enlarger lenses, lenses that are intended to be of the same focal length are not exactly the same; therefore, a device such as the photographic enlarger of the present invention should have some means of adjustment to compensate for the small variations of the actual focal length from the designed focal length of the lens 16. The compensation in the present device is a shiftable pivot point 44, the construction of which is shown in FIG. 3 of the drawings.

There is a bracket 90 that is attached to the side wall of the housing 10. Inwardly directed arms of the bracket 90 are provided with holes 91 to receive a threaded shaft 92 therethrough. The holes 91 in the bracket 90 are not threaded, and are sufficiently large to allow the shaft 92 to rotate therein. A block 94 has an internally threaded hole 95 to receive the shaft 92 in threaded engagement; and, the block 94 will be placed on the shaft 92 and received between the inwardly directed arms of the bracket 90 so that rotation of the shaft 92 will cause the block 94 to move back and forth between the inwardly directed arms. A bracket 96 similar to the bracket 90 is placed perpendicularly to the bracket 90, and is provided with arms having holes 98 therethrough to receive the threaded shaft 99. The shaft 99 is received within the holes 98 and can be rotated therein; also, the block 94 has an internally threaded hole 100 to be received on the shaft 99 between the arms of the bracket 96. Therefore, as the shaft 99 is rotated, the block 94 will be moved back and forth relative to the bracket 96.

It will thus be seen that, with the bracket 90 attached to a wall of the housing 10, rotation of the shaft 92 will move the block 94 and the bracket 96 back and forth; while, rotation of the shaft 99 will move the bracket 96 back and forth with respect to the bracket 90. The pivot pin 44 is carried by the bracket 96; so, by a combination of movements of the block 94 with respect to the bracket 90, and the bracket 96 with respect to the block 94, the pivot pin 44 can be moved in any desired direction.

From the foregoing description of the first embodiment of the invention, operation of the device should be apparent. First, the access door 14 is opened and a negative is placed into the negative carrier 54. The light source 58 would be turned on; and, to check the size of enlargement and the degree of tilt required, a piece of white paper may be placed on the easel 25. The arm 19 would be pulled forwardly until the image from the negative is of the right size projected on the easel 25. When the size of the image is proper, the easel 25 would be tilted until the proper reorientation of points is achieved. Of course, in actual practice, both actions may be accomplished simultaneously.

When the arm 19 is pulled forwardly, the pin 79 will be moved forwardly also; and, the pin 79 riding in the groove 76' of the arm 76 will cause counterclockwise rotation of the bell crank of which the arm 76 is one part. The arm 78 will move forwardly to shift the bar 85; and, the bar 85 will carry with it the bracket 55 to shift the pivot point 56 of the negative carrier 54. The negative carrier 54 will therefore be shifted relative to the lens 16.

As the easel 25 is tilted, the bar 26 will reciprocate back and forth, and will move the bell crank 31 to shift the plate 28 and the pin 41 that is on the plate 28. Shifting of the pin 41 will move the other bell crank by moving the arm 42 up or down. This will move the arm 45, to cause shifting of the bar 49 which will move the pin 51 and the bottom end of the negative carrier 54, causing rotation of the negative carrier 54 about the pivot point 56 to put the negative carrier in a plane in conjugate focus with the easel. Rotation of the negative carrier 54 will move the arm 64 which will in turn shift the member 66 to cause relocation of the light source 58. It will therefore be seen that rotation of the easel 25 will cause relocation of the light source 58 in such manner as to provide uniform illumination throughout the easel 25.

There is a diffusing screen 101 between the light source 58 and the negative carrier 54. The diffusing screen 101 is formed as a portion of a surface of a cylinder and would be made of opaline glass or the like. The diffuser 101 serves to give a plane of light to illuminate the negative over the entire surface of the negative. The illumination will of course not be uniform unless the easel 25 is vertical, i.e., perpendicular to the axis of the lens 16.

Figure 11:
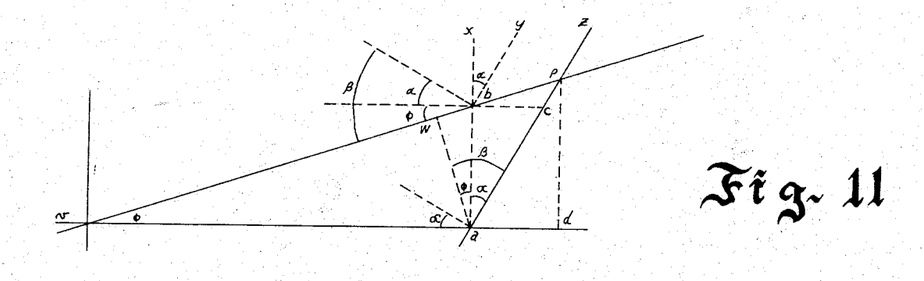

It has been found that, in dealing with a tilted easel, the intensity of light varies inversely as the cube of the distance from the apparent light source which, in this case, is the lens. The theory, as presently understood, can be shown by the following geometrical method, referring to FIG. 11 of the drawings:

(1)
$$\frac{\text{Illumination at } b \text{ on plane } by}{\text{Illumination at } b \text{ on plane } bx} = \frac{\cos \beta}{\cos \phi} = \frac{\frac{aw}{ap}}{\frac{aw}{ab}} = \frac{ab}{ap}$$

Since light varies directly at the cosine of the angle of incidence (2)
$$\text{Illumination at } a \text{ on plane } az = \cos \alpha = \frac{ab}{ac}$$

(3)

$$\frac{\text{Illumination at } b \text{ on plane } by}{\text{Illumination at } a \text{ on plane } az} = \frac{\frac{ab}{ap}}{\frac{ab}{ac}} = \frac{ac}{ap} = \frac{ab}{dp} = \frac{av}{dv}$$

Dividing (1) by (2)

(4) $$\frac{\text{Illumination at } p \text{ on plane } az}{\text{Illumination at } b \text{ on plane } by} = \frac{(av)^2}{(dv)^2}$$

Since light varies inversely as the square of the distance, and the angles of incidence are the same because $az$ and $by$ are parallel
Multiplying (3) by (4) we get:

$$\frac{\text{Illumination at } b \text{ on plane } by}{\text{Illumination at } a \text{ on plane } az} \times$$

$$\frac{\text{Illumination at } p \text{ on plane } az}{\text{Illumination at } b \text{ on plane } by} = \frac{av}{dv} \times \frac{(av)^2}{(dv)^2}$$

Combining, we get:

$$\frac{\text{Illumination at } p \text{ on plane } az}{\text{Illumination at } a \text{ on plane } az} = \frac{(av)^3}{(dv)^3}$$

Figure 7:
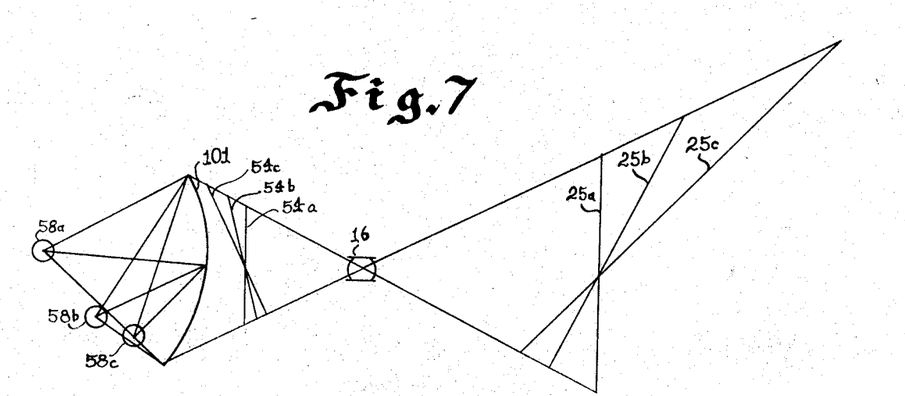
FIG. 7 is a schematic drawing showing the operation of the enlarger of the present invention.

The principle of operation of the enlarger will be better understood by referring to FIG. 7 of the drawings. Three different positions of the light source 58, the negative carrier 54, and the easel 25 are represented, the three different positions being designated $a$, $b$ and $c$.

The $a$ position shows the parts arranged for no change in perspective. The light source 58$a$ is approximately on the axis of the lens 16; and, the negative carrier 54$a$ is vertical, or perpendicular to the lens axis; and, the easel 25$a$ is vertical or perpendicular to the lens axis. The diffusing screen 101 is a circular arc in cross-section, with the light source 58$a$ at the center of the arc; therefore, the diffusing screen 101 will be uniformly illuminated. Light will emanate from the diffusing screen 101, pass through the lens 16 and illuminate the easel 25$a$.

The diffusing screen 101 used in the present embodiment of the invention has a radius of twice the focal length of the lens 16, and is tilted 4°10′. This gives good results, and was arrived at empirically. Other shapes and orientations may be found; but, that arrangement described above gives uniform easel illumination well within acceptable tolerances for the range of easel tilts shown.

When the easel is tilted to position 25$b$, the negative carrier will be tilted to the position 54$b$, and the light source will move to the position 58$b$. It will be obvious that the lower end of the easel 25$b$ is closed to the lens 16 than the upper end, yet all points must be illuminated with equal intensity. Relocation of the light source provides the needed correction. The light source 58$b$ is moved closer to the bottom of the diffusing screen 101 so that there is a gradient of intensities on the screen 101 from high intensity at the bottom to low intensity at the top.

Light emanating from the top of the screen 101 will pass through the lens 16 and illuminate the bottom of the easel 25$b$, and light emanating from the bottom of the screen 101 will illuminate the top of the easel 25$b$; therefore, it will be seen that the high intensity portion of the screen 101 will illuminate the portion of the easel 25$b$ that is farther away, and the low intensity portion of the screen 101 will illuminate the portion of the easel 25$b$ that is closer. The different intensities of light will correct for the different distances and give uniform illumination all over the easel 25$b$.

The above is also true for the light source 58$c$, the negative carrier 54$c$ and the easel 25$c$, the $c$ position being simply a greater degree of rotation of the easel, and the greater light correction required.

It will be understood from the foregoing description that the position of the negative carrier 54 is determined by the longitudinal movements of the pivot 56 and the pin 51 acting in concert or separately, and that the pivot 56 is linked to the pivot 21 on the easel, and the pin 51 is linked to stud 22 on the easel bracket.

Figure 8:
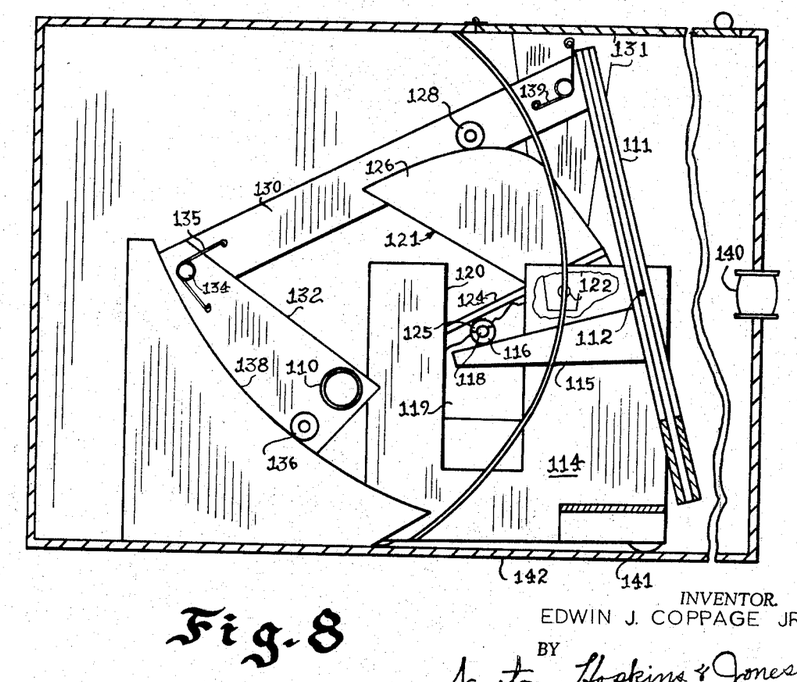
FIG. 8 is a partial longitudinal cross-sectional view of the modefied form of the present invention.

Attention is now directed to FIG. 8 of the drawings which shows a modified form of the present invention. This embodiment is designed to give more nearly exact location of the light source 110 than the device shown in FIGS. 1–7 of the drawings.

The mechanical linkage shown in FIG. 8 connects the light source 110 with the negative carrier 111 in such a manner that the light will be positioned to provide uniform easel illumination when the negative carrier is positioned in a plane of conjugate focus with the tilted easel. The device is intended for use primarily in conjunction with any automatic focuser that properly focuses all points of the negative on a sloping easel such as shown in FIGS. 2–6. The focusing mechanism has been omitted from FIG. 8; but, means for focusing has been indicated by the wheels 141 on the carriage 114.

In more detail, the device includes a negative carrier 111 that is pivotally attached at 112 to a carriage 114. An arm 115 extends rearwardly from the negative carrier 111, the arm 115 being a linear cam which engages a roller 116. The roller 116 is mounted on a shaft 118, the arrangement being such that the shaft 118 and the pivot 112 are on a line perpendicular to the negative carrier 111 at point 112, and the arm 115 acts as a radial cam to move the shaft 118 vertically.

The shaft 118 which carries the roller 116 is mounted in a slide plate 119 that is vertically movable within a slot 120, the slot 120 being in the carriage 114. Thus, as the negative carrier 111 is rotated about the pivot point 112, the arm 115 will be moved to move the roller 116. Movement of the roller 116 will, of course, move the shaft 118 which will slide the plate 119 in its slot 120.

There is a member 121 that is pivotally mounted to the bracket 131 at the pivot 122, the bracket 131 being carried by the housing. The member 121 includes a linear cam 124 which bears against the top of a roller 125, the roller 125 being mounted on the shaft 118, but on the opposite side of the slide plate 119. Extending upwardly and rearwardly from the pivot point 122, there is a cam 126 which will move with the member 124 about the pivot point 122. The cam 126 has a surface which receives a roller 128, and the roller 128 acts to adjust the position of the light source 110.

There is a link 130 that is pivotally attached to a bracket 131, and to a cam follower arm 132. The link 130 is pivotally attached to the arm 132 at the pivot 134, and it is urged by spring 135 in a clockwise direction as viewed in the drawings. The arm 132 has, at its opposite end, a roller 136 which rides along a cam surface 138; and, the light source 110 is on the same end of the arm 132 as the roller 126, and is adjacent thereto. There is a spring 139 that urges the arm 130 in a counterclockwise direction to keep the roller 128 against the cam 126.

It will now be seen that, as the negative carrier 111 is rotated in a counterclockwise direction as viewed in the drawings to give the desired re-orientation of points, the arm 115 will be moved downwardly. Since the spring 139 tends to urge the arm 130 in a counterclockwise direction to urge the roller 128 against the cam 126, the member 124 will also be urged downwardly against its roller 125; and, since the roller 126 is on the same shaft 118 with the roller 116, the roller 116 will be moved downwardly to follow the arm 115. Thus, the arm 130 will move in a counterclockwise direction, carrying with it the cam follower arm 132; therefore, the cam follower arm 132 will move downwardly and forwardly along the cam surface 138 to redispose the light source 110 to the location necessary to give even light distribution on the easel.

If the negative carrier 111 is rotated in a clockwise direction the arm 115 will be moved upwardly to move the roller 116 upwardly and carry the shaft 118 and the slide plate 119 upwardly. This motion will also carry the roller 125 upwardly and move the member 124 causing the member 121 to rotate about its pivot point 122 to move the cam 126. Motion of the cam 126 will move the roller 128 and cause the arm 130 to rotate in a clockwise direction against the tension of the spring 139. Clockwise movement of the arm 130 will cause the cam carrying arm 132 to move upwardly and rearwardly along the cam surface 138, and the spring 135 will assure that the roller 136 rides against the cam surface 138, thus relocating the light source 110.

Figure 9:
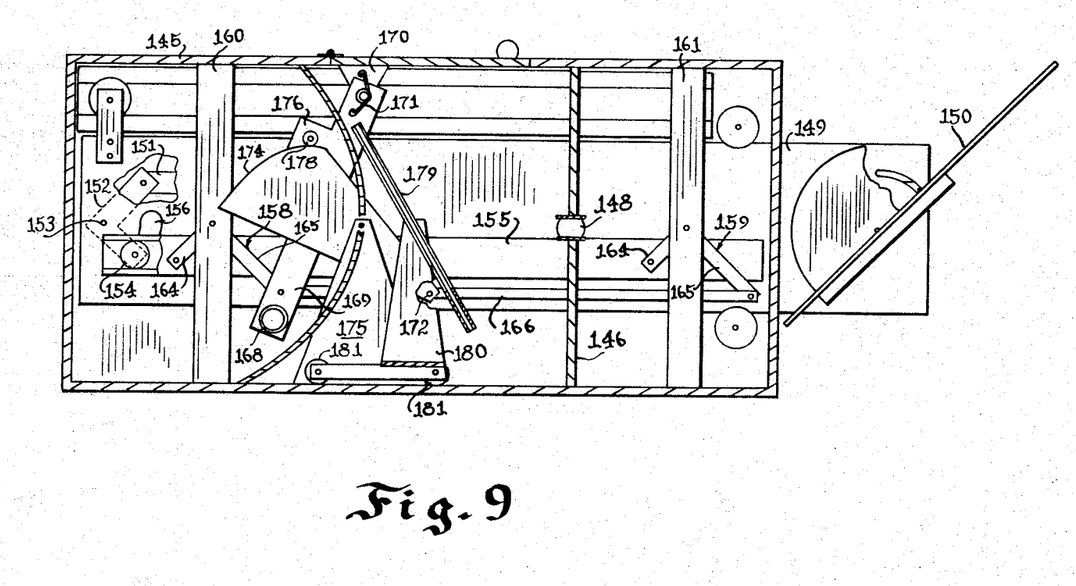
FIG. 9 is a longitudinal cross-sectional view of another embodiment of the present invention; and, FIG. 10 is a partial longitudinal cross-sectional view of still another modified form of the present invention; and, FIG. 11 is a diaphragm to illustrate the geometrical proof concerning the laws of light intensity.

FIG. 9 of the drawings shows another modification of the device of the present invention in which the easel is so connected that, when the easel is rotated, the light source will be relocated to give uniform illumination over the easel. For the sake of clarity automatic focusing means have been omitted from FIG. 9.

In more detail, the housing 145 has a transverse wall 146 which contains the lens 148; and, from the side of the housing 145, there is an easel carrying arm 149 on which is pivotally mounted an easel 150, the arrangement being very similar to the easel shown in FIG. 2 of the drawings. A bar 151 is pivotally attached to the easel 150, and extends rearwardly through the easel carrying arm 140 to the opposite end of the arm to a bell crank 152; and the bell crank 152 is pivotally attached to the arm 149 at 153. The bar 151 is pivotally attached to one arm of the bell crank 152, and the other arm of the bell crank 152 carries a roller 154 which is received within the channel of a channel member 155. There is an arcuate slot 156 through which the roller 154 projects, allowing the bell crank to pivot about its pivot point 153.

The channel member 155 is mounted on a pair of bell cranks 158 and 159 that are pivotally mounted on vertical member 160 and 161 respectively, the members 160 and 161 being attached to the housing 145. One arm 164 of each of the bell cranks 158 and 159 is pivotally attached to the channel member 155; and, the other arms 165 of the bell cranks 158 and 159 are connected together by a link 166.

The light source 168 is carried by an arm 169 that is pivotally connected to a bracket 170, the bracket 170 being attached to the housing 145; and, a spring 171 urges the arm 169 in a counterclockwise direction as viewed in the drawings.

There is a pivot point 172 at which a member 174 is attached to the link 166, the member 174 being pivoted at the same elevation as the lens 148 to a stationary bracket 175. A transverse extension 176 from the arm 169 carries a cam follower 178 which rides along the cam surface of the member 174; therefore, as the member 174 is moved, the roller 178 will move along the cam surface of the member 174 to reposition the light source 168.

The negative carrier 179 is pivotally carried by a carriage 180 which is provided with rollers 181 so that the carriage 180 can move along the floor of the housing 145.

It will therefore be seen that, as the easel 150 is moved in a clockwise direction, the bar 151 will be moved forwardly to rotate the bell crank 152 in a clockwise direction and urge the channel member 155 downwardly. As the channel member 155 is moved downwardly, the bell cranks 158 and 159 will be rotated in a counterclockwise direction to move the arms 164 thereof forwardly, and to move the link 166 thereof forwardly; therefore, the pivot 172 will be moved forwardly to rotate the member 174 in a counterclockwise direction, allow the roller 178 to move along the cam surface of the member 174, and re-position the light source 168.

As the easel 150 is moved in a counterclockwise direction, the bar 151 will be moved rearwardly of the device to rotate the bell crank 152 in a counterclockwise direction and raise the channel member 155. As the channel member 155 is raised, the bell cranks 158 and 159 will be moved in a clockwise direction to move the arms 164 thereof, and the link 166, rearwardly of the device causing the pivot 172 to move rearwardly and rotate the member 174 in a clockwise direction. As the member 174 is moved in a clockwise direction, the roller 178 will ride along the came surface of the member 174 and cause the arm 169 to move in a clockwise direction and re-position the light source 168 as required for the new tilt of the easel 150.

When the easel 150 is maintained at a constant angle, and the rate of enlargement is varied by extending the arm 149, no movement takes place in linkage that controls the light source, so the position of the light source 168 remains fixed: Only rotary movement of the easel re-positions the light source 168.

The device shown in FIG. 9 is intended primarily for use in conjunction with any suitable automatic focusing means, though it will function equally well with manual focusing.

It will be apparent from the similarity of parts and their functions in FIGS. 8 and 9 that, with slight modification, the mechanism in FIG. 8 could be substituted for similar parts of FIG. 9 and serve as an automatic tilt focuser as well as an automatic light positioner. It would then be necessary only to provide an automatic focuser for positioning the carriage 114 since the correct negative tilt would be automatically supplied by the members 115, 116, 118, 124 and 125. Member 126 would be extended downward and connected with the bar 166 at the pivot 172.

It should be remembered that focusing with an enlarger having perspective control involves two operations: (1) translation of the entire negative toward or away from the lens; and (2) rotation of the negative to the correct position of conjugate focus with the tilted easel.

Figure 10:
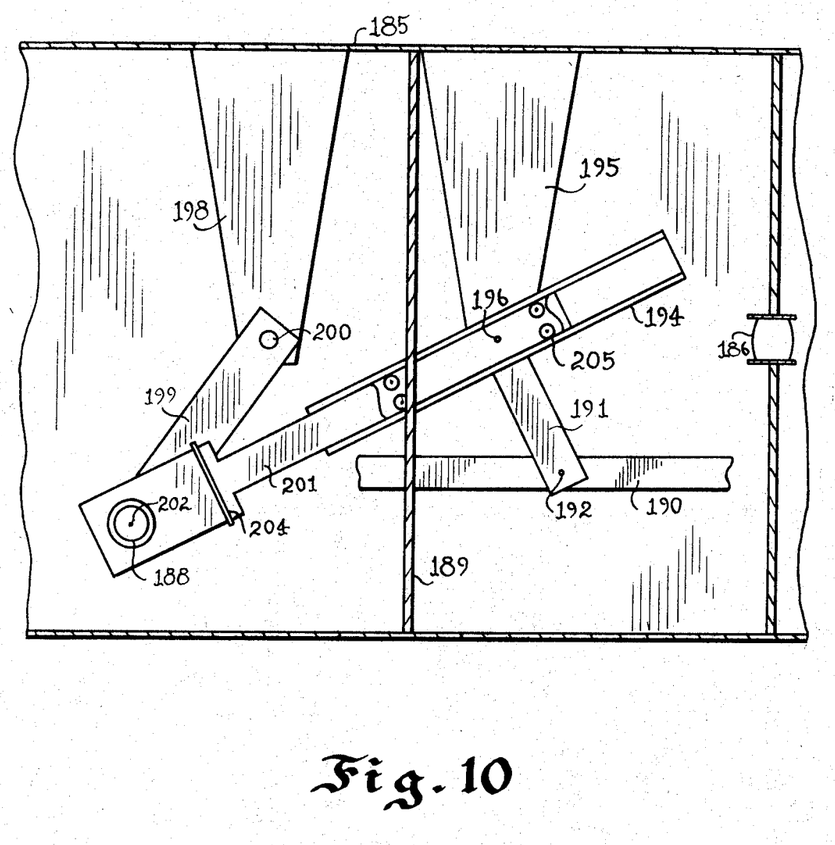

Another modification of the invention is shown in FIG. 10 of the drawings. The device as pictured shows only the housing 185, the lens 186 and the light source 188; the easel and the negative carrier are omitted for simplicity of illustration.

This device uses a flat diffusing screen 189 as opposed to the cylindrical diffusing screen shown in the other embodiments of the invention and will give theoretically exact light distribution at all angles of tilt of the easel. The mechanism includes a bar 190 which will be attached to the easel in a manner similar to the bar 166 of FIG. 9; and is attached to an arm 191 by a pivot point 192. The arm 191 is fixed to a channel member 194 at right angles; and, both the arm 191 and the channel member 194 are pivotally attached to a downwardly extending flange 195 that is rigidly attached to the housing 185.

It will thus be seen that, as the bar 190 is reciprocated, both the channel member 194 and the arm 191 will rotate about a common pivot point 196, the arm 191 always remaining in a fixed position with respect to the channel member 194.

Rearwardly of the flange 195, there is a second flange 198 that is attached to the housing 185 and carries, at its lowermost end, a link 199 which is attached to the flange 198 by the pivot 200. The opposite end of the link 199 has, pivotally mounted thereto, a slide 201 which carries the light source 188; and, the point of pivot between the slide 201 and the link 199 is on the center line of the light source 188 as indicated by the point 202, the light source 188 being a point source of light. In front of the light source 188 and attached to the slide 201, there is a light filter 204 of varied density. This filter 204 will be discussed in more detail hereinafter.

The slide 201 is carried by the channel member 194, there being a plurality of rollers 205 carried by the slide 201 to engage the arms of the channel member 194. It will be seen that the slide 201 can reciprocate within the channel member 194, the reciprocation being of course limited by the link 199.

The light source 188, due to its connection to the link 199, will travel in a circular arc; therefore, when the light source 188 is in the position shown in FIG. 10, the light source will be much closer to the screen 189 toward the bottom than toward the top. At its opposite extreme position, the light source 188 will be much closer to the diffusing screen 189 at the top than at the bottom; and, in the middle (when the light source is on the lens axis) the light source 188 will be closer to the middle of the diffusing screen than to the top or the bottom. It must be remembered that the diffusing screen 189 will not be illuminated uniformly except when the light source 188 is on the lens axis, because the easel will be tilted; therefore, greater and lesser light intensity must emanate from the diffusing screen 189 in order to illuminate the easel (not shown) uniformly. To provide uniform illumination on the diffusing screen when light source 188 is on lens axis, the filter 204 is provided. The filter 204 has substantially 100% light transmission at each edge, and about 42.7% light transmission at its center. This percentage transmission is based on the fact that intensity of light varies inversely with the square of the distance from the source, and directly with the cosine of the angle between the incident light beam and a normal to the plane. The transmission factor of the filter is of course a gradient from 100% to 42.7% from the edges to the center.

It will now be seen that, when the easel (not shown) is rotated in a clockwise direction as the device is viewed in the drawings, the bar 190 will be moved forwardly of the device which will rotate the arm 191 in a counter-clockwise direction, carrying with it the channel member 194, which will also be moved in a clockwise direction. The slide 201 will be carried by the channel member 194 to rotate in counterclockwise direction; however, the slide 201 is also pivotally connected to the link 199; therefore, the light source 188 that is on the slide 201 will move in an arc about the pivot point 200 of the link 199.

It will therefore be seen that, as the easel is rotated in a clockwise direction, the light source 188 will be moved toward the lower portion of the diffusing screen 189; and, when easel is moved in a counterclockwise direction, the opposite from that described will occur, and the light source 188 will be moved toward the upper portion of the diffusing screen 189.

Referring again to the position of the device shown in FIG. 10 of the drawings, it will be seen that the lower area of the diffusing screen 189 will receive a light that passes through the high light transmission portion of the filter 204, and the light source 188 is quite close to the lower portion of the diffusing screen 189; therefore, the lower portion of diffusing screen 189 will receive a relatively intense light. The center portion of the diffusing screen 189 will receive light through the area of the filter that is relatively dense, and the center portion of the diffusing screen 189 is farther away from the light source 188; therefore, the center portion of the diffusing screen 189 will receive light of somewhat less intensity than the lowest portion of the diffusing screen. The upper part of the diffusing screen 189 will receive light through high light transmission portion of the filter, and the upper portion of the diffusing screen 189 is quite far away from the light source 188; therefore, the upper portion of the diffusing screen will receive light of a lower intensity. Now, keeping in mind the tilt of the easel, it will be realized that the light from the lower portion of the diffusing screen will be directed by the lens 186 to the upper portion of the easel which is the farthest point from the lens 186; the center portion of the diffusing screen will transmit light to the center of the easel, which is an intermediate distance from the lens 186; and, the upper portion of the diffusing screen 189 will transmit light to the lower portion of the easel which is closest to the lens 186. It will thus be seen that the light will provide uniform intensity throughout the easel.

It will now be seen that the device of the present invention provides a very accurate control for the light source to give uniform light across a paper carrying easel, regardless of tilt of the easel, for the purpose of the reorientation of points from the negative. The easel, the negative carrier and the light source can all be tied together by linkages to provide completely automatic control; or, various other portions of the device can be tied together for automatic control, while other portions are left to be controlled manually and individually.

It will therefore be understood by those skilled in the art that the embodiments of the invention here presented are by way of illustration only and are meant to be in no way restrictive; therefore, numerous changes and modifications may be made, and the full use of equivalents resorted to, without departing from the spirit or scope of the invention as outlined in the appended claims.

What is claimed as invention is:

1. A photographic enlarger comprising a pivotal negative carrier, a pivotal easel, a light source removed from said negative carrier, means for moving said light source curvilinearly toward said negative carrier to vary the illumination areally of said negative carrier, said means being responsive to pivoting of said negative carrier and said easel.

2. A photographic enlarger comprising a pivotal negative carrier, a pivotal easel, a light source removed from said negative carrier, a diffusing screen between said light source and said negative carrier, and means for curvilinearly moving said light source toward and away from said diffusing screen to vary the illumination areally on said diffusing screen, said means for moving said light source being responsive to pivoting of said negative carrier and said easel.

3. A photographic enlarger comprising a negative carrier that is pivotally mounted, a light source removed from said negative carrier, a diffusing screen disposed between said light source and said negative carrier, means for curvilinearly moving said light source with respect to said diffusing screen, said light source being movable from a position close to one edge of said diffusing screen to provide graduated illumination of said diffusing screen to a position removed from and opposite the center of said diffusing screen to provide uniform illumination of said diffusing screen, said means for moving said light source being constructed and arranged to be responsive to pivoting of said negative carrier.

4. A photographic enlarger comprising a housing, a tiltable negative carrier, a light source within said housing removed from said negative carrier, a diffusing screen disposed between said light source and said negative carrier, an easel carried by said housing and removed from said light source, a lens for focusing light from said light source on said easel, said easel being tiltable to be diagonally disposed to the axis of said lens, and means for moving said light source curvilinearly with respect to said diffusing screen so as to provide uniform illumination of said easel when said easel is diagonally disposed to the axis of said lens.

5. A photographic enlarger with perspective control having a tiltable negative carrier, a light source removed from said negative carrier, a tiltable means for carrying sensitized paper, means for providing uniform illumination of said sensitized paper carrying means comprising a diffusing screen to transmit light from said light source to said sensitized paper carrying means, and means for curvilinearly moving said light source with respect to said diffusing screen to provide graduated illumination of said diffusing screen to compensate for the illumination intensity differentials caused by differences in distances of portions of said sensitized paper carrying means from the front nodal plane of said lens.

6. A photographic enlarger having perspective control, said enlarger comprising a housing, a lens mounted in an aperture of one wall of said housing, an extendable arm mounted in said housing and movable longitudinally thereof, an easel carried by said arm, said easel being pivotally mounted for tilting about a line contained in a plane perpendicular to the axis of said lens, a negative carrier within said housing aligned with the axis of said lens, said negative carrier being tiltable about a line parallel to the line about which said easel tilts, a light source removed from said negative carried, a diffusing screen between said light source and said negative carrier for transmitting light from said light source to said negative carrier, light from said negative carrier to pass through said lens and illuminate said easel, and means for arcuately moving said light source from a position adjacent one edge of said diffusing screen to provide graduated illumination of said diffusing screen to a position removed from and opposite the center of said diffusing screen to provide uniform illumination of said diffusing screen, said means for moving said light source being constructed and arranged to be responsive to tilting of said negative carrier, and further being arranged so that, when said negative carrier is tilted with respect to the axis of said lens, said light source will provide graduated illumination of said diffusing screen, and when said negative carrier is in a plane perpendicular to the axis of said lens, said light source will provide uniform illumination of said diffusing screen.

7. A photographic enlarger having a perspective control, said enlarger comprising a housing, a lens disposed within said housing, an extendable arm mounted in said housing, an easel carried by said arm, said easel being pivotally mounted for tilting about a line contained in a plane perpendicular to the axis of said lens, said easel being aligned with the axis of said lens, a negative carrier within said housing aligned with the axis of said lens, said negative carrier being tiltable about a line parallel to the line about which said easel tilts, a light source removed from said negative carrier, a diffusing screen between said light source and said negative carried for transmitting light from said light source to said negative carrier, light from said negative carrier to pass through said lens and illuminate said easel, and means for arcuately moving said light source toward and away from said diffusing screen to vary the illumination of said diffusing screen, said means for moving said light source being constructed and arranged to be responsive to tilting of said negative carrier.

8. A photographic enlarger having perspective control, said enlarger comprising a housing, a lens mounted in an aperture of one wall of said housing, an extended arm mounted in said housing, an easel carried by said arm, said easel being pivotally mounted for tilting about a line perpendicular to the axis of said lens, said easel being aligned with the axis of said lens, a negative carrier within said housing aligned with the axis of said lens, said negative carrier being tiltable about a line parallel to the line about which said easel tilts, a light source removed from said negative carrier, a diffusing screen between said light source and said negative carrier for transmitting light from said light source to said negative carrier, light from said negative carrier to pass through said lens and illuminate said easel, and means for arcuately moving said light source from a position adjacent one edge of said diffusing screen to a position removed from and opposite the center of said diffusing screen, said means for moving said light source being constructed and arranged to be responsive to tilting of said negative carrier.

9. A photographic enlarger having perspective control, said enlarger comprising a housing, a lens mounted in an aperture of one wall of said housing, an extendable arm mounted in said housing, an easel carried by said arm, said easel being pivotally mounted for tilting about a line contained in a plane perpendicular to the axis of said lens, said easel being aligned with the axis of said lens, a negative carrier within said housing aligned with the axis of said lens, said negative carrier being tiltable about a line parallel to the line about which the easel tilts, a light source removed from said negative carrier, a diffusing screen between said light source and said negative carrier for transmitting light from said light source to said negative carrier, light from said negative carried to pass through said lens and illuminate said easel, and means for arcuately moving said light source from a position adjacent one edge of said diffusing screen to provide graduated illumination of said diffusing screen to a position removed from and opposite the center of said diffusing screen to provide uniform illumination of said diffusing screen, said means for moving said light source being constructed and arranged to be responsive to tilting of said negative carrier and further being arranged so that when said negative carrier is tilted with respect to the axis of said lens, said light source will provide graduated illumination of said diffusing screen, and when said negative carrier is in a plane perpendicular to said axis of said lens, said light source will provide uniform illumination of said diffusing screen.

10. A photographic enlarger having perspective control, said enlarger comprising a housing, a lens mounted in an aperture of one wall of said housing, an extendable arm mounted in said housing, an easel carried by said arm, said easel being pivotally mounted for tilting about a line perpendicular to the axis of said lens, said easel being aligned with the axis of said lens, a negative carrier within said housing aligned with the axis of said lens, said negative carrier being tiltable about a line parallel to the line about which said easel tilts and intersecting the axis of said lens, a light source removed from said negative carrier, a diffusing screen between said light source and said negative carirer for transmitting light from said light source to said negative carrier, light from said negative carrier to pass through said lens and illuminate said easel, and means for arcuately moving said light source from a position adjacent one edge of said diffusing screen to provide graduated illumination of said diffusing screen to a position removed from and opposite the center of said diffusing screen to provide uniform illumination of said diffusing screen, said means for moving said light source being constructed and arranged to be responsive to tilting of said negative carrier and further being arranged so that, when said negative carrier is tilted with respect to the axis of said lens, said light source will provide graduated illumination of said diffusing screen, and when said negative carrier is in a plane perpendicular to said axis of said lens, said light source will provide uniform illumination of said diffusing screen.

11. A photographic enlarger having perspective control, said enlarger comprising a housing having a front wall and a side wall, a lens mounted in an aperture in said front wall, an extendable arm mounted in said housing adjacent said side wall and parallel thereto, said extendable arm being movable longitudinally of said housing, an easel carried by said extendable arm, said easel being pivotally mounted for tilting about a line perpendicular to the axis of said lens and intersecting the axis of said lens, said easel being aligned with the axis of said lens, a negative carrier within said housing aligned with the axis of said lens, said negative carrier being tiltable about a line parallel to the line about which said easel tilts and intersecting the axis of said lens, a light source removed from said negative carrier, a diffusing screen between said light source and said negative carrier for transmitting light from said light source to said negative carrier, light from said negative carrier to pass through said lens and illuminate said easel, and means for arcuately moving said light source in response to tilting of said easel to provide uniform illumination of said easel.

12. A photographic enlarger having perspective control, said enlarger comprising a housing having a front wall and a side wall, a lens mounted in an aperture in said front wall, an extendable arm mounted in said housing adjacent said side wall and parallel thereto, said extendable arm being movable longitudinally along said housing, an easel carried by said extendable arm, said easel being pivotally mounted for tilting about a line perpendicular to the axis of said lens and intersecting the axis of said lens, said easel being aligned with the axis of said lens, a negative carrier within said housing aligned with the axis of said lens, said negative carrier being tiltable about a line parallel to the line about which said easel tilts and intersecting the axis of said lens, said negative carrier further being adjustable toward and away from said lens, a light source removed from said negative carrier, a diffusing screen between said light source and said negative carrier for transmitting light from said light source to said negative carrier, light from said negative carrier to pass through said lens and illuminate said easel, means for arcuately moving said light source in response to tilting of said negative carrier and for tilting said negative carrier in response to tilting of said easel, said means for moving said light source in response to tilting of said negative carrier comprising an arm carrying said light source on one end and pivotally mounted by a bracket fastened to said housing, a cam follower on said arm engaging a curved cam at one end of a bell crank pivotally mounted on a bracket fastened to the housing, a radial cam on the other arm of said bell crank engaging a cam follower mounted on an arm attached to said negative carrier and extending outwardly therefrom, said means for tilting said negative carrier in response to tilting of said easel comprising a radial cam at one end of said negative carrier engaging a pin attached to a bar slidably mounted to move along a line parallel to the lens axis in brackets fastened to the housing, a pin mounted on said bar and received by a radial cam slot at one end of the bell crank pivotally mounted on an adjustable bracket fastened to the housing, the other arm of said bell crank bearing a radial cam channeled to receive said cam follower on one end of a sliding bar mounted on said extendable arm to form an angle with said extendable arm equal to the angle formed by the arms of said bell crank, a pin on said sliding bar received by a radial slot in one arm of a small bell crank pivotally mounted on said extendable arm, the other arm of said small bell crank being pivotally connected to one end of a bar, and the other end of said bar being pivotally connected to said easel, the arrangement being such that said easel when tilted to various angles receives uniform illumination as the axis of said negative carrier is positioned in conjugate focus with the axis of said easel.

13. A photographic enlarger comprising a lens, a tiltable easel with an axis in a plane perpendicular to the axis of said lens, a tiltable negative carrier with an axis parallel to the axis of said easel, said axes being adjustable to vary the distance of said axes from said lens, a light source removed from said negative carrier, a diffusing screen between said light source and said negative carrier, and means for arcuately moving said light source with respect to said diffusing screen to produce various gradients of graduated illumination of said diffusing screen thus providing uniform illumination of said easel when said easel is diagonally disposed at various angles to said lens axis.

14. A photographic enlarger as recited in claim 13 wherein, said means for moving said light source is constructed and arranged to be responsive to tilting of said easel.

15. A photographic enlarger as recited in claim 13 wherein, said means for moving said light source is constructed and arranged to be responsive to tilting of said negative carrier in such a manner that when the negative carrier is in conjugate focus with the plane of said easel tilted at various angles said light source will be positioned to provide uniform illumination of said tilted easel.

16. A photographic enlarger comprising a lens, a tiltable easel with an axis in a plane perpendicular to the axis of said lens, a tiltable negative carrier with an axis parallel to the axis of said easel, said axes being adjustable to vary the distances of said axes from said lens, a point type light source removed from said negative carrier, a varied transmission light filter between said light source and said negative carrier, a flat diffusing screen between said light filter and said negative carrier, means for arcuately moving said light source and said filter toward and away said diffusing screen and rotating said filter and said light source about the center of said light source to produce various gradients of graduated illumination of said diffusing screen thus providing uniform illumination of said easel when said easel is diagonally disposed at various angles to the axis of said lens.

17. A photographic enlarger as recited in claim 16 wherein, said means for moving said light source and said filter are constructed and arranged to be responsive to tilting of said easel.

18. A photograhpic enlarger comprising a lens, a tiltable easel with an axis in a plane perpendicular to the axis of said lens, a titltable negative carrier with an axis parallel to the axis of said easel, said axes being adjustable to vary the distance of said axes from said lens, a linear light source removed from said negative carrier, a curved diffusing screen disposed between said light source and said negative carrier, and mechanical linkage coupling said light source with said easel in such manner that rotation of said easel from a position normal to the axis of said lens to a desired slope constrains said light source to move from its normal position at or near the center of curvature of said diffusing screen along a predetermined path curving toward one edge of said diffusing screen to that point on said path which by virtue of its different distances to and different angles incidence with various points on said diffusing screen produces a graduated illumination of said diffusing screen such that the relative intensity of illumination of each point on said diffusing screen varies approximately as the cube of the distance that the projected easel image of said point is from the front nodal plane of said lens, thereby producing substantially uniform illumination of all points on said sloping easel.

19. A photographic enlarger comprising a lens, a tiltable easel with an axis in a plane perpendicular to the axis of said lens, a tiltable negative carrier with an axis parallel to the axis of said easel, said axes being adjustable to vary the distance of said axes from said lens, a linear light source removed from said negative carrier, a curved diffusing screen disposed between said light source and said negative carrier, and mechanical linkage coupling said light source with said negative carrier in such manner that rotation of said negative carrier from a position normal to the axis of said lens to a plane of conjugate focus with said easel tilted to a desired slope constrains said light source to move from its normal position at or near the center of curvature of said diffusing screen along a predetermined path curving toward one edge of said diffusing screen to that point on said path which by virtue of its different distances to and different angles of incidence with various points on said diffusing screen produces a graduated illumination of said diffusing screen such that the relative intensity of illumination of each point on said diffusing screen varies approximately as the cube of the distance that the projected easel image of said point is from the front nodal plane of said lens, thereby producing substantially uniform illumination of all points on said sloping easel.

20. A photographic enlarger comprising a lens, a tiltable easel with an axis in a plane perpendicular to the axis of said lens, a tiltable negative carrier with an axis parallel to the axis of said easel, said axes being adjustable to vary the distances of said axes from said lens, a point type light source removed from said negative carrier, a flat diffusing screen disposed between said light source and said negative carrier, a light filter of varied transmission disposed between said light source and said diffusing screen, said filter having a radially graduated light transmission increasing from the center to the edges, and mechanical linkage coupling said light source with said easel in such manner that rotation of said easel from a position normal to the axis of said lens to a desired slope constrains said light source to move from its normal position removed from and opposite the center of said diffusing screen along a predetermined path curving toward one edge of said diffusing screen and rotates said filter and said light source about the center of said light source an amount equal to the rotation of said easel and in opposite direction from rotation of said easel and orients said light source and said filter with respect to said diffusing screen such that the combined effect of different transmission factors of said filter, different distances to and different angles of incidence with the various points on said diffusing screen produces a graduated illumination of said diffusing screen such that the relative intensity of illumination at each point on said diffusing screen varies as the cube of the distance that the projected easel image of said point is from the front nodal plane of said lens, thereby producing uniform illumination of all points on said sloping easel.

21. A photographic enlarger having perspective control, said enlarger comprising a housing having a front wall and a side wall, a lens mounted in an aperture in said front wall, an extendable arm mounted in said housing adjacent said side wall and parallel thereto, said extendable arm being movable longitudinally along said housing, an easel carried by said extendable arm, said easel being pivotally mounted for tilting about a line perpendicular to the axis of said lens and intersecting the axis of said lens, said easel being aligned with the axis of said lens, a negative carrier within said housing aligned with the axis of said lens, said negative carrier being tiltable about a line parallel to the line about which said easel tilts and intersecting the axis of said lens, said negative carrier further being adjustable toward and away from said lens, a linear light source removed from said negative carrier, a curved diffusing screen between said light source and said negative carrier for transmitting light from said light source to said negative carrier, light from said negative carrier to pass through said lens, and illuminate said easel, means for coupling said light source with said easel in such manner that rotation of said easel from a position normal to the axis of said lens to a desired slope constrains said light source to move from its normal position at or near the center of curvature of said diffusing screen along a predetermined path curving toward one edge of said diffusing screen to that point on said path which by virtue of its different distances to and different angles of incidence with various points on said diffusing screen produces a graduated illumination of said diffusing screen such that the relative intensity of illumination at each point on said diffusing screen varies approximately as the cube of the distance that the projected easel image of said point is from the front nodal plane of said lens thereby producing substantially uniform illumination of all points on said sloping easel, said means for coupling said light source with said easel comprising an arm carrying said light source on one end and pivotally mounted on a bracket fastened to said housing, a cam follower on said arm engaging a curved cam at one end of a member pivotally mounted on a bracket fastened to said housing, the other end of said member being pivotally connected to a bar, each end of said bar pivotally connected to one arm of a pair of bellcranks, said pair of bellcranks pivotally connected to a pair of brackets fastened to said housing, the other arms of said pair of bellcranks pivotally connected to opposite ends of a channeled member, said pivots of said pair of bellcranks forming a parallelogram, a roller received by said channeled member, said roller mounted on one arm of a bellcrank, said bellcrank pivotally mounted on said extendable arm carrying said easel, the other arm of said bellcrank pivotally connected to one end of a bar link and the other end of said bar link pivotally connected to said easel.

References Cited

UNITED STATES PATENTS

| | | | |
|---|---|---|---|
| 751,347 | 2/1904 | Scheimpflug | 88—24 |
| 1,654,070 | 12/1927 | Corlett et al. | |
| 2,023,970 | 12/1935 | Newman | 88—24 |
| 2,327,818 | 8/1943 | Peterson | 88—24 |
| 2,928,327 | 3/1960 | Blackmer et al. | 95—75 |
| 2,938,279 | 5/1960 | Hemstreet et al. | 88—24 |
| 3,222,984 | 12/1965 | Loshin | 88—24 |

FOREIGN PATENTS

| | | |
|---|---|---|
| 211,169 | 10/1924 | Great Britain. |
| 624,862 | 1/1936 | Germany. |
| 1,141,803 | 12/1962 | Germany. |

NORTON ANSHER, *Primary Examiner.*

V. A. SMITH, R. A. WINTERCORN,

*Assistant Examiners.*